United States Patent [19]

Hirahara et al.

[11] Patent Number: 4,965,302
[45] Date of Patent: Oct. 23, 1990

[54] THERMOPLASTIC POLYESTER RESIN COMPOSITION AND MOLDED ARTICLES PRODUCED THEREFROM

[75] Inventors: Takuji Hirahara, Kawasaki; Takashi Nakamura, Sagamihara; Yoshiko Kumeno, Yokohama; Takayuki Ohta, Sagamihara; Tetsuo Kasai, Machida, all of Japan

[73] Assignee: Mitsubishi Kasei Corporation, Tokyo, Japan

[21] Appl. No.: 328,095

[22] Filed: Mar. 23, 1989

[30] Foreign Application Priority Data

Mar. 29, 1988 [JP] Japan .................................. 63-73421
Mar. 29, 1988 [JP] Japan .................................. 63-73424

[51] Int. Cl.$^5$ ................... C08K 5/3417; C08K 5/353; C08K 5/15
[52] U.S. Cl. .................................. 524/83; 524/89; 524/92; 524/94; 524/110; 524/159; 524/162; 524/208; 524/242; 524/283
[58] Field of Search .................... 524/83, 92, 94, 89, 524/110, 282, 283, 159, 162, 208, 242

[56] References Cited

U.S. PATENT DOCUMENTS

| | | | |
|---|---|---|---|
| 3,386,795 | 6/1968 | Coldwell et al. | 524/89 |
| 4,189,423 | 2/1980 | Kumano et al. | 524/94 |
| 4,374,220 | 2/1983 | Sonnenberg | 524/94 |
| 4,552,911 | 11/1985 | Cohnen et al. | 524/94 |
| 4,581,396 | 4/1986 | Sonnenberg | 524/89 |
| 4,814,366 | 3/1989 | Hirahara et al. | 524/89 |

Primary Examiner—Kriellion Morgan
Attorney, Agent, or Firm—Oblon, Spivak, McClelland, Maier & Neustadt

[57] ABSTRACT

Disclosed herein is a thermoplastic polyester molded article comprising a thermoplastic polyester and at least one of the specified diimide compounds, the latter being blended in an amount effective for ultraviolet screening. The polyester molded article and a composition for producing it according to this invention is capable of screening ultraviolet rays not only in the short wavelength region but also in the long wavelength region and has uniform dispersion stability and thermal stability. The molded articles of the present invention are free of undesired coloration and deposition of extraneous matter.

14 Claims, 2 Drawing Sheets

THERMOPLASTIC POLYESTER RESIN COMPOSITION AND MOLDED ARTICLES PRODUCED THEREFROM

BACKGROUND OF THE INVENTION

The present invention relates to a thermoplastic polyester resin composition and molded articles thereof. More particularly, it relates to a polyester resin composition suited for producing films, containers etc. having excellent ultraviolet screening properties, and such molded articles.

Polyesters, a most typical example of which is polyethylene terephthalate, have been widely used as material for fibers, films, etc., owing to their excellent mechanical and chemical properties. Recently, attention is focused on their good adaptability to containers for carbonated beverage, fruit juice, liquid seasonings, edible oil, liquor, wine and the like because of excellent transparency, gas barrier properties and hygienic safety of polyesters. Also, use of polyester film as window-adhesive film for the purposes of energy saving, screening of heat rays and prevention of scattering of broken glass pieces as a safety measure against earthquakes is rapidly spreading in recent years as a new way of application of polyester film. In the field of agriculture and horticulture, strong request is heard for a transparent film which can selectively screen ultraviolet rays in the specific wavelength region for the purposes of promoting growth of farm products and increasing their harvests (see, for example, Japanese Patent Application Laid-Open (Kokai) No. 53-98242 (1978)).

These conventional polyester containers and films are indeed very excellent in ultraviolet screening in the short wavelength region of up to about 320 nm, but they are almost completely transmittable to ultraviolet rays in the longer wavelength region and visible light rays. When edible oil or a liquid seasoning such as sweetened cooking sake (Japanese mirin), dressing, etc., is filled in such a polyester container and kept therein for several months, the content quality tends to be degraded, for example, a delicate change tends to take place in color, taste, flavor, etc., although the degree of such degradation or change depends on the type of food contained and the keeping conditions. Such deterioration of the content is caused by the external factors such as oxygen, heat, light and especially ultraviolet rays and microorganisms. Therefore, in the case of polyester containers, since they are relatively excellent in oxygen barrier properties, it would become possible to notably prevent the quality degradation of the content even though kept in storage for a long time if the ultraviolet screening properties of polyester is further improved On the other hand, in the case of window-adhesive film, if it allows passage of, for example, ultraviolet rays in the sunrays, they may cause discoloration or fading of various types of furniture, books and other interior household stuffs, so that it is necessary to minimize or perfectly prevent transmission of such ultraviolet rays. In agriculture and horticulture, by means of mulching with a transparent covering material capable of substantially preventing transmission of ultraviolet rays of wavelengths not greater than 370 nm, it is possible to promote growth of many useful plants and to have a high and early harvest of high-quality crops (see, for example, Japanese Patent Application Laid-Open (Kokai) No. 53-124556 (1978).

Currently, in the art, it is a common practice to add ultraviolet absorbers to polyester for said purposes. These ultraviolet absorbers, however, are generally expensive and involve difficulties in their addition. Also, these compounds usually have a high subliming tendency and most of them are poor in thermal stability, so that troubles tend to take place in the adding and molding steps. Further, in case of using a polyester film containing an ultraviolet absorber for food containers or packages, the ultraviolet absorber is liable to contaminate the content.

Various types of ultraviolet absorber (such as EP-A-263,705 and International Publication No. W086/04903) have been disclosed for solving the problems, but none of these known ultraviolet absorbers is capable of screening ultraviolet rays in the longer wavelength region.

The present invention has for its object to provide a polyester resin composition which is suitable for producing molded articles having excellent ultraviolet screening properties capable of screening ultraviolet rays even in the longer wavelength region, also has high thermal and dispersion stability and has no possibility of causing trouble such as deposition of extraneous matter on the molded articles through the molding process, and the molded articles obtained by using the polyester resin composition.

The continuous researches by the present inventors on a polyester resin composition capable of meeting the objective have led to the finding that a thermoplastic polyester resin composition comprising a thermoplastic polyester resin and a specific diimide compound(s) is capable of sufficiently screening ultraviolet rays in both short wavelength and long wavelength regions, and the present invention was attained on the basis of such finding.

SUMMARY OF THE INVENTION

In a first aspect of the present invention, there is provided a molded article comprising a thermoplastic polyester and an effective amount for ultraviolet screening of at least one diimide compound selected from the group consisting of diimide compounds represented by the following formulae (I) and (II):

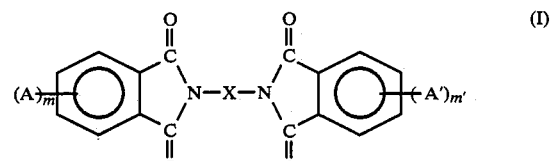

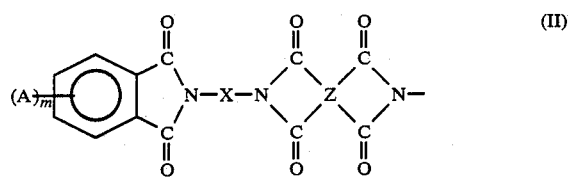

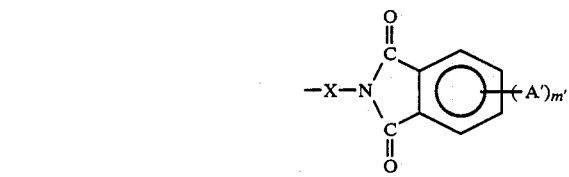

wherein m and m' represent independently an integer from 0 to 4; A and A' represent independently a member selected from the group consisting of halogen, —COOH and esters thereof, —OH, —O—C(=O)CH₃, —NH₂, —CN, —NO₂, —SO₃H and metal salts thereof, (substituted) alkoxyl group, (substituted) aliphatic group and (substituted) aromatic group, and when m and/or m' are/is 2 to 4, A and A' may be the same or different from each other; X represents

,

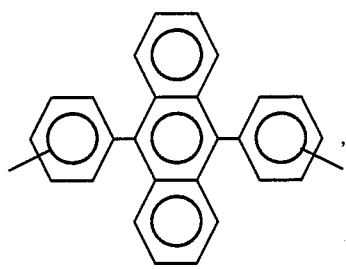,

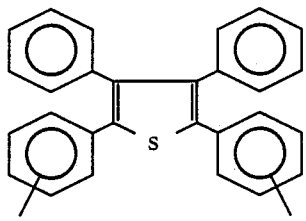,

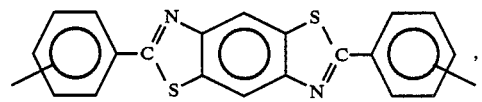

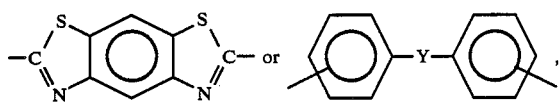 or 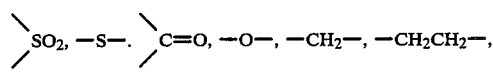, wherein Y represents

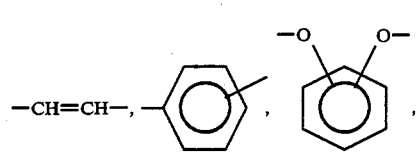

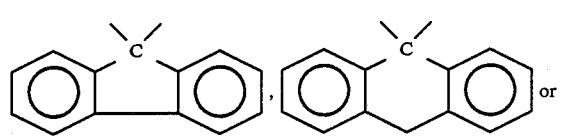 or

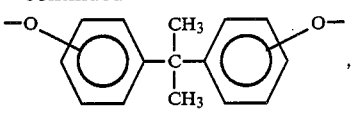, and the aromatic group contained in X may be substituted with a substituent represented by A or A'; and Z represents

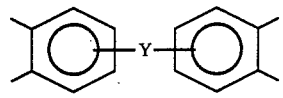 or

wherein Y is the same as defined above, and the aromatic group contained in Z may be substituted with a substituent represented by A or A'.

In a second aspect of the present invention, there is provided a thermoplastic polyester resin composition comprising a thermoplastic polyester resin and an effective amount for ultraviolet screening of at least one diimide compound selected from the group consisting of diimide compounds represented by the formulae (I) and (II) as defined above.

In a third aspect of the present invention, there is provided a process for producing a thermoplastic polyester resin composition comprising a thermoplastic polyester resin and at least one diimide compound selected from the group consisting of diimide compounds represented by the formulae (I) and (II) as defined above.

DETAILED DESCRIPTION OF THE INVENTION

Figure 1:
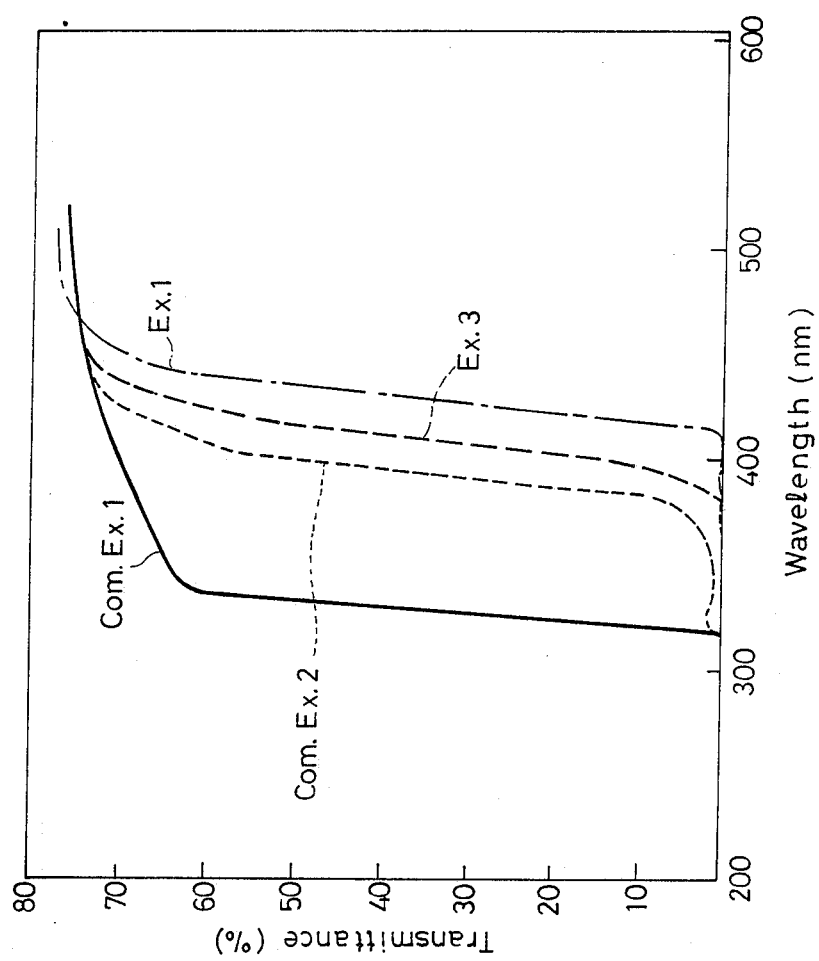
FIG. 1 and FIG. 2 are the graphs showing light transmittance of the polyester resin compositions obtained in Examples 1, 3, 8 and 9 and Comparative Examples 1 and 2. In the graph, transmittance is plotted as ordinate and wavelength as abscissa.

In the present invention, diimide compounds represented by the following general formula (I) or (II) are used as a compound or compounds to be added to a thermoplastic polyester resin:

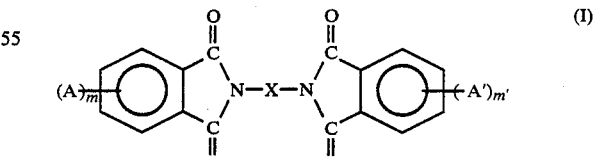 (I)

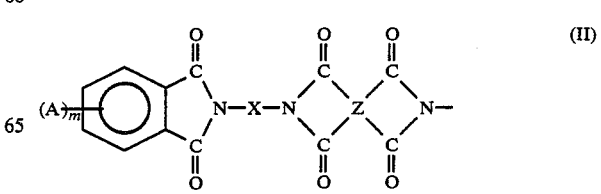 (II)

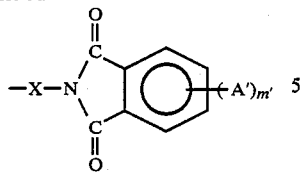

In the general formula (I), A and A' represent independently a substituent selected from the group consisting of halogen, —OH, —O—C(=O)CH$_3$, —COOH or esters thereof, —NH$_2$, —CN, —NO$_2$, —SO$_3$H or metal salts thereof, (substituted) alkoxyl group, (substituted) aliphatic group and (substituted) atomatic group Among them, —COOH or its ester forming groups are preferred.

Halogens may include chlorine and bromine. A typical example of esters of —COOH is $C_1$ to $C_{20}$ alkyl ester. Sodium salt can be mentioned as an example of metal salts of —SO$_3$H. The alkoxyl groups may include those having 1 to 13 carbon atoms. Example of the aliphatic group is alkyl or alkenyl group having 1 to 13 carbon atoms, and example of the aromatic group is phenyl. The alkoxyl, aliphatic and aromatic groups may be substituted with a carboxyl group, hydroxyl group, halogen or alkyl group.

Also in the formula (I), m and m' represent independently an integer from 0 to 4, preferably from 1 to 4. When m and/or m' are/is 2 to 4, A and A' may be the same or different from each other. X represents

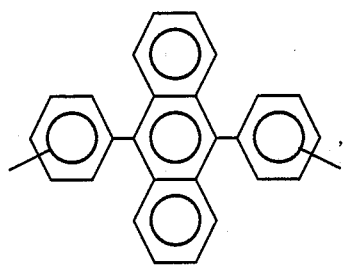

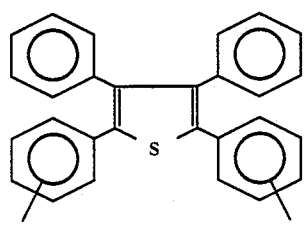

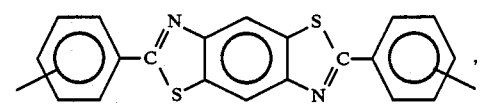

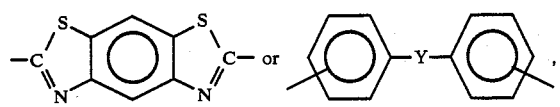

wherein Y represents $\diagdown$SO$_2$, —S—, $\diagdown$C=O, —O—, —CH$_2$—,

—CH$_2$CH$_2$—, —CH=CH—,

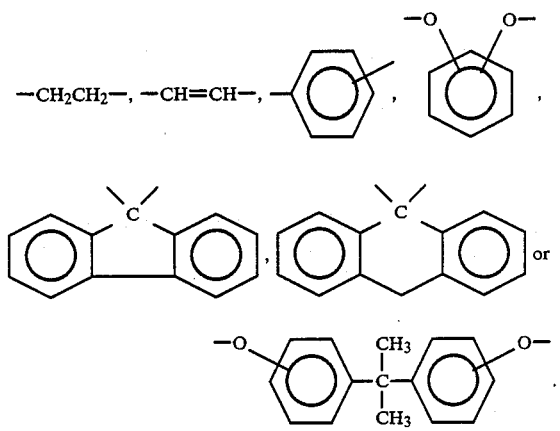

The aromatic nucleus contained in X may be substituted with any of the substituents shown in the definition of A and A' above.

In the general formula (II), A, A', m, m' and X represent the same as defined in the general formula (I), and Z represents

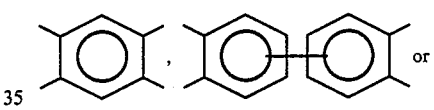

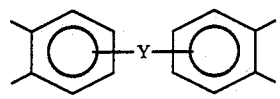

wherein Y is the same as defined above The aromatic nucleus contained in Z may be substituted with any of the substituents shown in the above definition of A and A'.

The diimide compounds of the formula (I) and formula (II) can be produced by a conventional method, for example, by the following process (Bull. Soc. Chim. France, 727-732, 1951).

Into a flask provided with a stirrer and a nitrogen gas feed pipe, is added a compound of the following formula (V):

NH$_2$-X-NH$_2$       (V)

wherein X is the same as defined above, and an aprotonic polar solvent such as dimethylacetamide as the solvent. The content is sufficiently stirred at a temperature of equal to or below the boiling point of the solvent, preferably 100° C. or below, to form a slurry-like mixed liquid. Then a phthalic acid compound represented by the following formula (VI):

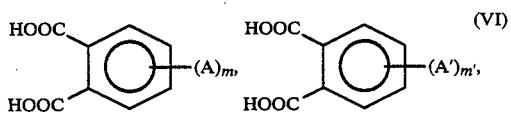 (VI)

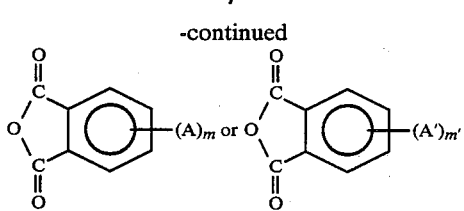

wherein A, A', m and m' are the same as defined above and a solvent are added, and the mixture is reacted while passing nitrogen gas into the reaction system at a temperature of 100° C. or below, preferably 50° C. or below for one to 24 hours to obtain an amide acid solution.

To this amide acid solution, are added dimethylaminopyridine as catalyst and acetic anhydride as dehydrating agent, and the mixture is reacted at room temperature to 150° C. for one to 24 hours. The thus obtained reaction solution is supplied into a large amount of methanol and filtered to obtain a powdery diimide compound of the aboveshown formula (I).

Examples of the compounds represented by the aboveshown formula (V) include 3,3'-dihydroxy-4,4'-diaminobiphenyl, 3,3'-dimethyl-4,4'-diaminobiphenyl, diaminodiphenylsulfone

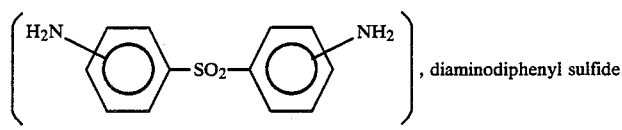, diaminodiphenyl sulfide

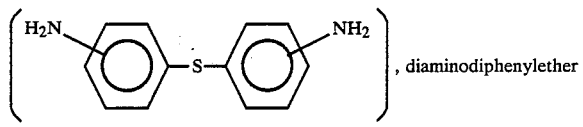, diaminodiphenylether

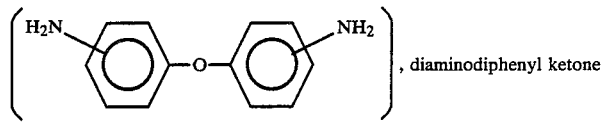, diaminodiphenyl ketone

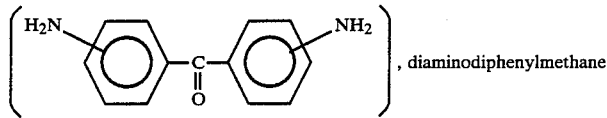, diaminodiphenylmethane

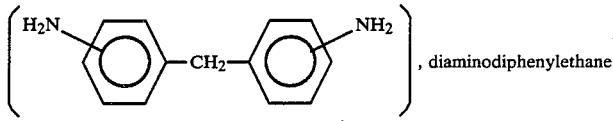, diaminodiphenylethane

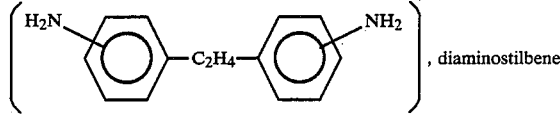, diaminostilbene

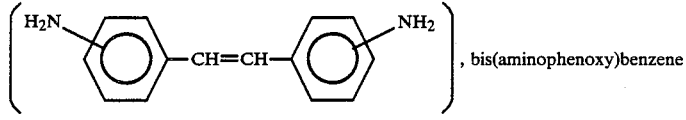, bis(aminophenoxy)benzene

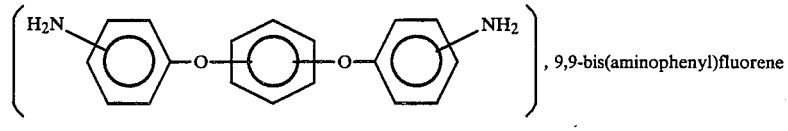, 9,9-bis(aminophenyl)fluorene

-continued

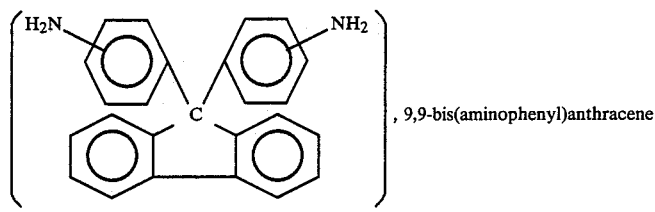, 9,9-bis(aminophenyl)anthracene

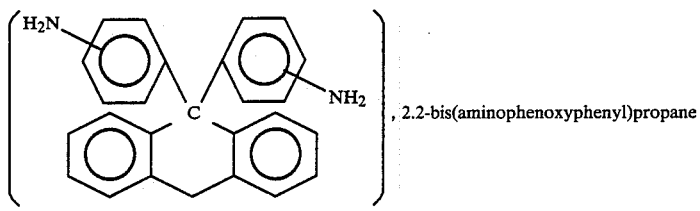, 2.2-bis(aminophenoxyphenyl)propane

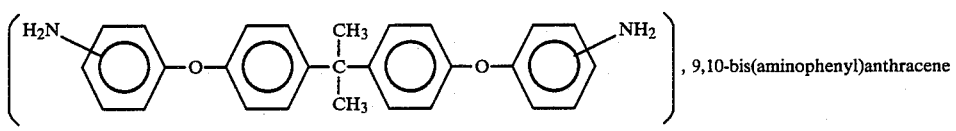, 9,10-bis(aminophenyl)anthracene

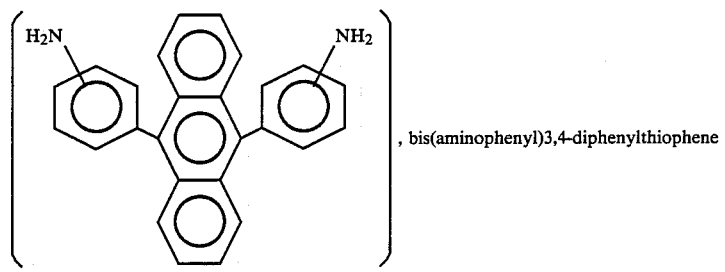, bis(aminophenyl)3,4-diphenylthiophene

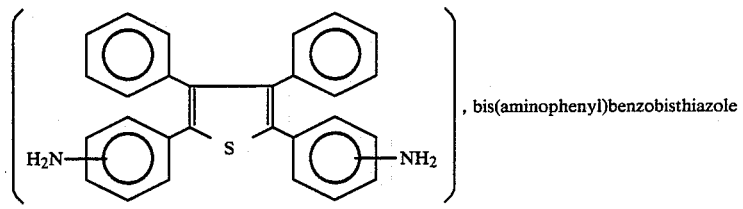, bis(aminophenyl)benzobisthiazole

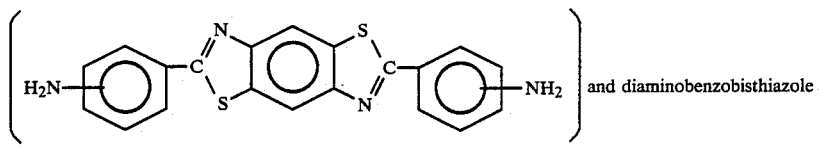 and diaminobenzobisthiazole

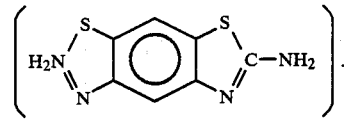.

The aromatic nucleus contained in these diamino compounds may be substituted with any of the substituents mentioned in the definitions of A and A' in the above-shown formulae (I) and (II). Among these diamino compounds, 3,3'-dimethyl-4,4'-diaminobiphenyl, 9,10-bis(4-aminophenyl)anthracene, bis(3-aminophenyl)benzobisthiazole, bis(4-aminophenyl)benzobisthiazole and bis(4-aminophenyl)-3,4-diphenylthiophene are most preferably used.

As examples of the phthalic acid compounds of formula (VI) functioning as terminal group of the diimide compounds of the formulae (I) and (II), there can be cited phthalic acid, trimellitic acid, 4-carboxyphthalic acid, 4-chlorophthalic acid, 4-hydroxyphthalic acid, 4-acetoxyphthalic acid, 4-nitrophthalic acid, 4-methoxyphthalic acid, 4-ethoxyphthalic acid, 4-methylphthalic acid, 4-ethylphthalic acid, 4-aminophthalic acid, 4-sulfophthalic acid and sodium sulfonate thereof, 4-phenylphthalic acid, and 5-, 6- or 3-substituted isomers of any of the above-cited compounds. Among them, phthalic acid derivatives substituted with COOH, OH or its ester forming group are preferred.

Diimide compounds of the formula (II) can be synthesized, for example, as follows.

A compound of the formula (V):

$$NH_2-X-NH_2 \qquad (V)$$

wherein X is the same as defined above, is added with an aprotonic polar solvent such as dimethylacetamid and the mixture is sufficiently stirred at a temperature of equal to or below boiling point of the solvent, preferably 100° C. or below, to prepare a slurry-like mixed solution. To this solution, are added a tetracarboxylic acid of the following formula (VII):

wherein Z is the same as defined above, or a mono- or dianhydride thereof in an amount being half the amount of the compound of formula (V) by mole and the solvent, and the mixture is reacted while passing nitrogen gas into the reaction system at a temperature of 100° C. or below, preferably 50° C. or below, for one to 72 hours. This is followed by further addition of twice the molar quantity, based on said reaction product, of a compound of the following formula (VI):

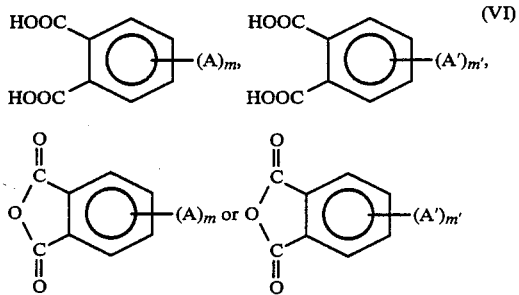

wherein A, A', m and m' are the same as defined above, and a solvent. The mixture is reacted while passing nitrogen gas into the reaction system at a temperature of 100° C. or below, preferably 50° C. or below, for one to 24 hours to obtain an amide acid solution.

This amide acid solution is then added with dimethylaminopyridine as catalyst and acetic anhydride as dehydrating agent and stirred for reacting at room temperature to 150° C. for one to 24 hours. The resulting reaction solution is supplied into a large amount of methanol and filtered to provide a powdery diimide compound of the formula (II).

The tetracarboxylic acids of the formula (VII) or their mono- or dianhydrides usable in this invention include various types of tetracarboxylic acids such as pyromellitic acid, biphenyl tetracarboxylic acid, diphenyl sulfone tetracarboxylic acid, diphenyl sulfide tetracarboxylic acid, diphenyl ether tetracarboxylic acid, diphenyl ketone tetracarboxylic acid, diphenylethane-tetracarboxylic acid and the like, their mono- and di-anhydrides and their structural isomers. It is preferred that the carboxyl groups on the same phenyl nucleus are situated in adjacent positions, such as 2,3,2',3'-, 3,4,3',4'-, etc. Also, the phenyl nucleus of these tetracarboxylic acids may be substituted with groups referred to in the definitions of A and A' above.

Among these tetracarboxylic acids, pyromellitic acid, 3,4,3',4'-biphenyltetracarboxylic acid and their monoor dianhydrides are preferably used.

The amount of the diimide compound of formula (I) or (II) used in the present composition is 0.001 parts by weight or more, preferably 0.001 to 70 parts by weight, more preferably 0.001 to 50 parts by weight, further preferably 0.001 to 30 parts by weight, and most preferably 0.01 to 10 parts by weight, to 100 parts by weight of the thermoplastic polyester resin. When its amount is less than 0.001 part by weight, no envisaged ultraviolet screening effect can be obtained.

In the present invention, in order to enhance the ultraviolet screening effect, it is recommended to additionally use a naphthalenedicarboxylic acid compound represented by the following formula (III) or (IV):

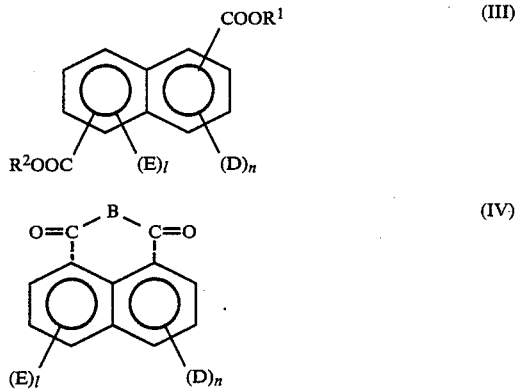

In the formula (III), $R^1$ and $R^2$ represent independently hydrogen, an alkyl group which may be substituted or an aryl group. Examples of the alkyl group are methyl, ethyl, propyl and butyl. Example of the aryl group is phenyl. Tolyl group may be cited as an example of substituted alkyl group.

D and E represent independently halogens, —COOH or its esters, —OH, —O—C(=O)CH$_3$, —NH$_2$, —CN, —NO$_2$, —SO$_3$H or its metal salts, (substituted) alkoxy group, (substituted) aliphatic group or (substituted) aromatic group. Halogens include chlorine and bromine. Examples of esters of —COOH are $C_1$ to $C_{20}$ alkyl esters. Sodium salt is a typical example of metal salts of —SO$_3$H. The alkoxy group may be selected from those having 1 to 13 carbon atoms. Alkyl groups having 1 to 13 carbon atoms or alkenyl group having 1 to 13 carbon atoms may be mentioned as examples of the aliphatic group, and phenyl group as the aromatic group. The alkoxyl groups, aliphatic groups and aromatic groups may be substituted with a carboxyl group, hydroxyl group, halogen or alkyl group.

Also in the formula (III), l and n represent independently an integer from 0 to 3.

In the formula (IV), D, E, l and n represent the same as defined above, and B represents —O— or

wherein $R^3$ is hydrogen, an aliphatic group such as methyl, ethyl, propyl and butyl, a substituted aliphatic group such as carboxymethyl, carboxyethyl and carboxypropyl, an aromatic group such as phenyl or a substituted aromatic group such as carboxyphenyl or tolyl.

Also in the formula (IV), the acid anhydride or imide group represented by —C(=O)—B—C($\alpha$O)— is bonded to 1 and 2 positions, 1 and 8 positions or 2 and 3 positions of a naphthalene ring.

Examples of the compounds represented by the formula (III) or (IV) include dicarboxylic acid structural isomers such as 1,4-, 2,6-, 2,7-, 1,8-,1,5- or 2,3-naphthalenedicarboxylic acids, esters or anhydrides thereof, and imides produced from the reactions of the naphthalenedicarboxylic acids and ammonia, amines, aminocarboxylic acid, aminoalcohols and the like. Also, the naphthalene ring of these naphthalenedicarboxylic acids and esters, acid anhydrides or imides thereof may be substituted with halogen, —OH, —O—C(=O)CH$_3$, —NO$_2$, —NH$_2$, —CN, —SO$_3$H or its metal salts, —COOH or its esters, (substituted) alkoxyl group, (substituted) aliphatic group or (substituted) aromatic group.

More precisely, the compounds of the formula (III) or (IV) include naphthalene-2,3-dicarboxylic acid and its dimethyl, diethyl, dipropyl, dibutyl and diphenyl esters, naphthalene-2,3-carboxylic acid anhydride, naphthalene-2,3-dicarboxyimide,
N-(carboxymethyl)naphthalene-2,3-dicarboximide,
N-($\beta$-carboxyethyl)naphthalene-2,3-dicarboximide,
N-(o-(m- or p-)carboxyphenyl)naphthalene-2,3-dicarboximide,
N-(bromomomethyl)naphthalene-2,3-dicarboximide,
N-(hydroxymethyl)naphthalene-2,3-dicarboximide and
their 1,4-, 1,5-, 1,8-, 2,6- and 2,7- structural isomers.
Also, the above-cited dicarboxylic acids and esters, anhydrides or imides thereof may be substituted with 1 to 6 —OH, —O—C(=O)CH$_3$, halogens, —NO$_2$, —NH$_2$, —CN, —SO$_3$H or its metal salts, —COOH or its esters, (substituted) alkoxy group, (substituted) aliphatic group or (substituted) aromatic group. It is important to possess a naphthalenedicarboxylic acid skeleton for attaining the effect of combined use.

Especially preferred naphthalenedicarboxylic acid compounds are naphthalene-2,6-dicarboxylic acid, naphthalene-2,7-dicarboxylic acid, naphthalene-2,3-dicarboxylic acid, naphthalene-1,4-dicarboxylic acid or esters, preferably, lower alkyl esters thereof.

In case of using a naphthalenedicarboxylic acid of the formula (III) or (IV) in combination with a diimide compound of the formula (I) or (II), the amount thereof added is in the range of 0.001 parts by weight or more, preferably 0.001 to 70 parts by weight, more preferably 0.001 to 50 parts by weight, further preferably 0.001 to 30 parts by weight, and most preferably 0.01 to 10 parts by weight based on 100 parts by weight of the thermoplastic polyester resin. When the amount of the compound (III) or (IV) added is less than 0.001 part by weight, no notable effect of combined used is obtainable.

The conventional methods for producing polyester compositions can be employed for obtaining the thermoplastic polyester composition of this invention by adding a compound of the formula (I) or (II) to a polyester and mixing them, if necessary, with a compound of the formula (III) or (IV).

The diimide compounds represented by the formula (I) or (II) or the naphthalenedicarboxylic acid compounds represented by the formula (III) or (IV) can be used either in the form as it is or in the form of an oligomer after reacting the compounds with a suitable substance such as glycols. Such compounds may be added at any stage in the polyester preparation process or may be added at any stage before molding process in order to provide the same ultraviolet screening effect.

Thus, in this invention, the diimide compounds and the naphthalenedicarboxylic acids may be added at any desired stage in the process before molding of the polyester composition is completed. For example, these compounds may be added before the start of, during or after the end of the polycondensation reaction, or in the course of molding process after pulverization.

Particularly when using a compound of the formula (I) or (II) in which A and A' both represent a polymerizable group such as —OH, —COOH or its esters, —SO$_3$H or its metal salts, it is recommended to add the compound just before the start of or during the polycondensation reaction for producing a polyester because this facilitates bonding of the compound to polyester chains.

The thermoplastic polyester used in this invention is produced from dicarboxylic acid component of at least one dicarboxylic acid selected from aromatic dicarboxylic acids such as terephthalic acid, isophthalic acid, phthalic acid, naphthalenedicarboxylic acid, diphenyl ether dicarboxylic acid and diphenyl sulfone dicarboxylic acid, and esters thereof, alicyclic dicarboxylic acids, which are the nuclear hydrogenated compounds of the aromatic dicarboxylic acids, such as hexahydroterephthalic acid, and esters thereof, aliphatic dicarboxylic acids such as succinic acid, adipic acid, sebacic acid, azelaic acid, etc., and esters thereof, and unsaturated dicarboxylic acids such as fumaric acid, 4-carboxycinnamic acid, etc., and esters thereof, and glycol component primarily comprising ethylene glycol. Polyethylene terephthalate units are the main constitutional repeating units of the polyester. However, polyester may contain dicarboxylic acids other than terephthalic acid in an amount of 20% or less based on the dicarboxylic acid component.

The glycol component of the polyester may contain, beside ethylene glycol, an aliphatic glycol such as diethylene glycol, trimethylene glycol, tetramethylene glycol and neopentyl glycol, alicyclic glycol such as cyclohexanedimethanol, bisphenol derivatives such as 2,2-bis(4'-$\beta$-hydroxyethoxyphenyl)propane and bis-(4'-$\beta$-hydroxyethoxyphenyl)sulfone, polyethylene glycols, polytetramethylene glycol, etc. represented by the formula:

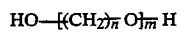

wherein n is an integer from 1 to 6, and m is an integer of 4 or greater,
in an amount of 20% or less based on the total amount of the glycol component. The polyesters used in this invention may also be the ones obtained by copolymerizing an oxyacid such as glycolic acid and hydroxybenzoic acid. Further, as far as the polyester maintains substantially a linear polymer, it may be copolymerized with a polyfunctional (tri- or higher- functional) compound such as pentaerythritol, trimethylolpropane, trimellitic acid, trimesic acid, pyromellitic acid, etc., or a monofunctional compound such as obenzoylbenzoic acid. Still further, said polyester may be blended with other thermoplastic resins such as polybutylene terephthalate, polyethylene naphthalate, polyester elastomer, polycarbonate, etc., in an amount usually used in the polyester compositions.

The polyester used in this invention is preferably the one having an intrinsic viscosity of 0.5 to 2.5, more preferably 0.6 to 1.2. The range of polyester viscosity is important especially in relation to the molding method in case of producing, for instance, hollow articles. Particularly when obtaining the substantially non-oriented hollow articles by extrusion blow molding, it is necessary to maintain the fluidity of molten polyester above a certain level for preventing drawdown, although the required fluidity level depends on the volume of the blow molded article. Thus, usually, a polyester having an intrinsic viscosity of 0.7 or above, preferably 0.8 to 1.2, is used. In the case of stretch hollow molding, extrusion molding for obtaining mono- or biaxially stretched films from sheets and injection molding for obtaining various forms of molded articles, it is possible to use a polymer with a relatively low viscosity in comparison with the case of the extrusion blow molding, viz. usually 0.5 or above, preferably 0.6 to 1.2 in intrinsic viscosity. A polyester with a notably high viscosity may be also used depending on the required properties of molded articles.

In the present invention, known additives used in the polyester composition, such as stabilizer, releasing agent, antistatic agent, dispersing agent, coloring matter such as dye and pigment, etc., may be added at any stage in the polyester preparation process, or they may be added by a so-called masterbatch formulation before molding.

Preferred dyes and pigments for use in this invention are titanium oxide, carbon black, phthalocyanine blue, phthalocyanine green, ultramarine, cobalt blue, titanium yellow, red iron oxide, calcined amber, yellow oxide, and heat-resistant oil-soluble dyes, which are mostly polycyclic, such as oil-soluble dyes having a perinone, quinophthalone, anthtrapyridone, anthraquinone type skeleton. Among them, those having a group reactable with the functional groups in polyester to attach to a polyester chain are especially preferred. It is also preferred to use those dyes or pigments which have good compatibility with polyesters, show satisfactory heat resistance and color stability in the production and molding of polyester and also cause no hygienic problem in application to packages or containers of foods.

The dye or pigment is added into the polyester composition by, for example, the following way. First, is prepared a masterbatch containing the dye or pigment in a concentration as high as several to 100 times, preferably, up to about 50 times the predetermined concentration. This masterbatch is diluted with a non-colored polyester or a polyester tinted to other color tone to develop new color tone, thereby obtaining a polyester composition of a desired color tone.

The polyester resin composition of this invention may be molded in the form as it is, or if necessary, it may be molded after subjecting to a solid-phase polymerization under a high-degree vacuum or in a stream of an inert gas to effect high-degree polymerization in order to reduce the content of aldehyde and oligomer. An aftertreatment such as solvent extraction with xylene or chloroform may be also employed before molding.

The polyester resin composition having the excellent ultraviolet screening properties according to this invention is subjected to melt molding to obtain molded articles. For melt molding, all known types of methods generally used for polyester molding are appliable. Typical examples are usual blow molding method such as extrusion-blow molding method, injection-blow molding method and cold parsion method in which a preform is reheated and then biaxially stretched. According to these method, it is possible to obtain hollow molded articles having excellent ultraviolet screening properties, gas barrier properties, toughness and chemical resistans as well as glass-like transparency that adds to a high quality impression of the molded article. These molded articles are particularly suited for use as containers of seasonings such as soy bean sauce (Japanese shoyu), sauce, sweetened cooking sake (Japanese mirin), dressing, etc., edible oil, carbonated drinks, fruit juice, sake, wine, cosmetics, chemicals and the like. Also, the mono or biaxially stretched films obtained from the extrusion molded sheets, or the laminate films with other types of resin films find particularly useful application to packages of ordinary foods, chemicals, cosmetics, etc., window-stuck film and agricultural and horticultural mulches.

It is further possible to obtain various other forms of molded articles by injection molding.

The molded articles obtained from the polyester resin composition of this invention can substantially screen ultraviolet rays with wavelength of up to 400 nm although the screening ability depends on thickness of the molded articles, amount of diimide compound added and other factors.

The present invention will hereinafter be described in further detail according to the following examples. In the following descriptions of the Examples, all "parts" are by weight unless otherwise noted.

Shown below are the various methods for measurement used in the Examples.

Intrinsic viscosity

Measured in a 50/50 (by weight) mixture of phenol and tetrachloroethane at a concentration of 1.0 g/dl and 30° C.

Ultraviolet transmittance

Measured in the usual way by using HITACHI SPECTROPHOTOMETER Model 340.

Amount of acetaldehyde

Determined by high-sensitivity gas chromatography after 2-hour water extraction at 160° C.

Inert gas flow rate

The volume of the inert gas that passed through unit amount of resin (kg) per unit time (hr) was measured and the volume (l) obtained by converting it to the 1 atm and 25° C. basis was employed.

SYNTHESIS EXAMPLE 1

(diimide compounds represented by formula (I))

Synthesis of a diimide compound of the following formula (1) obtained from 9,10-bis(4-aminophenyl)anthracene and trimellitic acid anhydride:

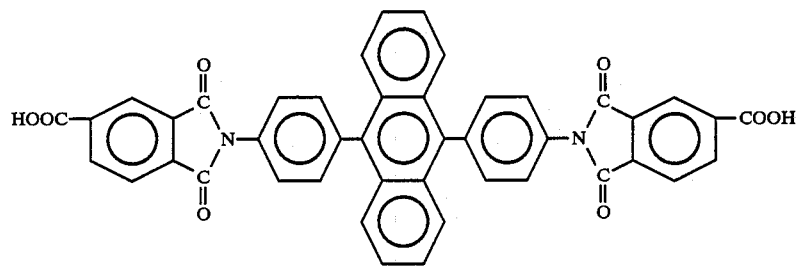

(1)

Precisely weighed 7.21 g of 9,10-bis(4-aminophenyl)anthracene was supplied into a 300 ml four-necked flask equipped with a stirrer and nitrogen gas feed pipe, followed by addition of 50 ml of dimethylacetamide and sufficient stirring of the mixture to form a slurry-like mixed solution. To this solution, were further added 7.77 g of trimellitic acid anhydride and 50 ml of dimethylacetamide to adjust the concentration to 15 wt/vol% and subjected to a reaction at 30° C. for 5 hours while passing nitrogen gas into the reaction system to obtain an amide acid solution.

To this amide acid solution, were added dimethylaminopyridine of 0.03 time the molar amount of trimellitic acid as catalyst and acetic anhydride of 1.5 times the molar amount of trimellitic acid as dehydrating agent, and the mixture was heated to 80° C under stirring and kept under this condition for 3 hours. The thus obtained reaction solution was supplied into a large quantity of methanol and filtered to obtain a powdery diimide compound of the formula (1).

SYNTHESIS EXAMPLE 2

(diimide compounds represented by formula (II))

Synthesis of a diimide compound of the formula (2) obtained from 9,10-bis(4-aminophenyl)anthracene, pyromellitic acid anhydride and trimellitic acid:

Into a 300 ml four-necked flask provided with a stirrer and a nitrogen gas feed pipe, were added 12.98 g of 9,10-bis(4-aminophenyl)anthracene and 50 ml of dimethylacetamide and the mixture was stirred well to form a slurrylike mixed solution. To this solution, were further added 3.93 g of pyromellitic acid anhydride and 40 ml of dimethylacetamide, and the mixture was stirred at 30° C for 3 hours while passing nitrogen gas into the reaction system and reacted at 80° C. for 5 hours to obtain a green slurry-like solution.

Then 6.99 g of trimellitic acid anhydride and 69 ml of dimethylacetamide were further added to adjust the concentration to 15 wt/vol%, stirred at 30° C. for 3 hours while passing nitrogen gas into the reaction system and reacted at 80° C. for 5 hours.

To the thus obtained green amide acid slurry-like solution, were added dimethylaminopyridine and acetic anhydride in amounts of 0.06 mole and 3 moles, respectively, to one mole of trimellitic acid, and the mixture was heated to 80° C. under stirring and kept at this state for 3 hours.

The resulting reaction mixture was fed into a large quantity of methanol, filtered and dried to obtain a brown powdery diimide compound of the formula (2).

EXAMPLE 1

Into a polymerizer, were added 4,000 parts of bis(β-hydroxyethyl) terephthalate, 0.4 part of germanium dioxide, 0.4 part of orthophosphoric acid and 15 parts of diimide compound of the formula (1) synthesized in Synthsis Example 1. The mixture in the polymerizer was heated gradually from 260° C. while the inner pressure of the polymerizer was reduced little by little from normal pressure, and after a total time of polymerization of 3.0 hours under a pressure of 1 torr and at 280° C., there was obtained a polyester having an intrinsic viscosity of 0.71.

This polyester, after usual drying in vacuo, was molded into a 350 μm thick sheet by using a 30 mmφ extruder having its cylinder and nozzle portions adjusted to a temperature of 275° C., screw speed of 40 r.p.m. and an extrusion rate of 80 g/min.

The sheet showed light transmittances of 0.2%, 0% and 0% at wavelengths of 370 nm, 380 nm and 400 nm, respectively. A light transmittance chart is shown in FIG. 1.

Further, this dry resin was continuously injection

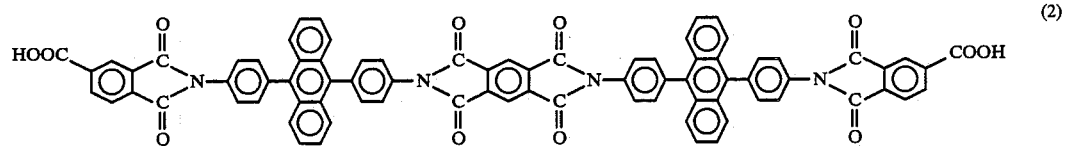

(2)

molded into 100 mm ×100 mm ×2 mm thick boards by using an Injection Molder IS-60B (Toshiba Kikai Co. Ltd.) arranged to have a temperature of 275° C. at the cylinder portions and nozzle and set at screw speed of 100 r.p.m., injection time of 10 seconds and mold cooling water temperature of 10° C. Any of the obtained boards had no deposit such as white powder even after injection molding of 500 boards.

EXAMPLES 2-6

Various types of polyesters were obtained by following the same procedure as Example 1 except that 15 parts of various types of diimide compounds represented by the following formula (I)' were used in place of the diimide compound of the formula (1). Ultraviolet transmittance measured is shown in Table 1.

of 10° C. This preform was blow molded by a blow molder BMB-3 (CORPOPLAST CORP.) set at preheating oven temperature of 90° C., blow pressure of 20

TABLE 1

Diimide compounds and UV transmittance
(Diimide compounds added)

HOOC—⟨benzene⟩—C(=O)—N—X—N—C(=O)—⟨benzene⟩—COOH  (I)'

Amount added: 0.4% based on polyester

| Example | X Group in formula (I)' | Polyester color tone | Light transmittance 370 nm | 380 nm |
|---|---|---|---|---|
| 2 | HO—⟨⟩—⟨⟩—OH | Milk white | 2.5% | 21.2% |
| 3 | ⟨(C₆H₅)₂C=C(C₆H₅)₂ bridged by S⟩ | Light yellow | 0 | 0 |
| 4 | ⟨benzobisthiazole with phenyl⟩ | Yellow | 0 | 0 |
| 5 | —⟨benzobisthiazole⟩— | Yellow | 5.2 | 8.1 |
| 6 | —⟨⟩—CH=CH—⟨⟩— | Yellow | 0 | 0 |

EXAMPLE 7

A transparent polyester having an intrinsic viscosity of 0.60 and colored in pale green was obtained by carrying out the same operations as in Example 1 except for addition of 0.005 part of copper phthalocyanine.

The polyester chip surfaces were crystallized at resin temperature of 165° C. in a SOLID AIRE ® stirring crystallizer (mfd. by Bepex Corp., U.S.A.), then transferred into stationary solid phase polymerization tower and, after 3-hour drying at 120°-160° C., subjected to solid phase polymerization at resin temperature of 210° C. for 10 hours by passing nitrogen gas at a rate of 30 l/kg.hr.

The solid polymerization product had an intrinsic viscosity of 0.75 and contained 3.0 ppm of acetaldehyde in chips. A preform was molded from this polyester by using an injection molder IS-60B (Toshiba Kiki Co., Ltd.) having its cylinder portions and nozzle adjusted to 275° C. and set at screw speed of 100 r.p.m., injection time of 10 seconds and mold cooling water temperature kg/cm² and molding cycle of 10 seconds to obtain a bottle having a capacity of 1 litre. Ultraviolet transmittance at the 350 μm thick portion of this bottle was 0.2%, 0% and 0% at wavelengths of 370 nm, 380 nm and 400 nm, respectively.

EXAMPLE 8

A polyester with intrinsic viscosity of 0.70 was obtained in the same way as Example 1 except for use of 15 parts of diimide compound (2) synthesized in Synthesis Example 2.

After ordinary drying in vacuo, the polyester was molded into a 350 μm thick sheet by using a 30 mmφ extruder having its cylinder and nozzle portions set at a temperature of 275° C. and operated at a screw speed of 40 r.p.m. and an extrusion rate of 80 g/min.

Figure 2:
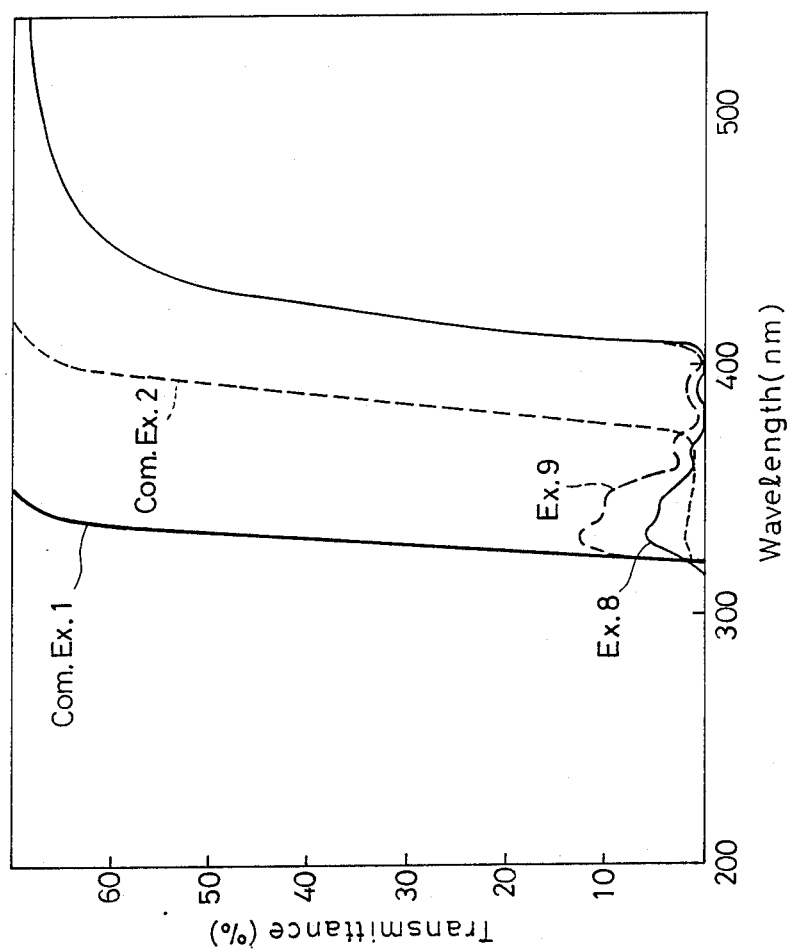

The sheet showed light transmittance of 0.5%, 0% and 0% at wavelengths of 370 nm, 380 nm and 400 nm, respectively. A light transmittance chart of the sheet is shown in FIG. 2.

Further, this dry resin was continuously injection molded into 100 mm × 100 mm × 2 mm thick boards by using an injection molder IS-60B (Toshiba Kiki Co., Ltd.) having its cylinder and nozzle portions set at a temperature of 275° C. and operated at a screw speed of 100 r.p.m., injection time of 10 seconds and mold cooling water temperature of 10° C. Any of the molded boards had no contaminant deposition such as white powder even after successive 500 runs of injection molding.

EXAMPLE 9

A polyester with intrinsic viscosity of 0.70 was obtained by conducting the same operations as Example 8 except that the amount of diimide compound (2) synthesized in Synthesis Example 2 was changed to 6 parts.

A 345 μm thick sheet was obtained from this polyester according to the same process as Example 1, and this sheet showed light transmittance of 12.6%, 2.7%, 0.6% and 0.2% at wavelengths of 330 nm, 370 nm, 380 nm and 400 nm, respectively. A light transmittance chart of the sheet is shown in FIG. 2.

EXAMPLE 10

A polyester with intrinsic viscosity of 0.71 was prepared by following the same procedure as Example 9 except for the addition of 12 parts of 2,6.naphthalenedicarboxylic acid. A 350 μm thick sheet molded from this polyester showed light transmittance of 0%, 2.2%, 0.5% and 0.2% at wavelengths of 330 nm, 370 nm, 380 nm, and 400 nm, respectively.

EXAMPLE 11

A polyester with intrinsic viscosity of 0.70 was obtained from the same process as Example 9 except for the addition of 12 parts of N-carboxymethyl- 4-chloro-1,8 naphthalenedicarboximide, and a 355 μm thick sheet was molded from this polyester in the manner described above. The sheet showed light transmittance of 0%, 0.9%, 0.2% and 0.2% at wavelengths of 330 nm, 370 nm, 380 nm and 400 nm, respectively.

EXAMPLES 12–15

Various types of polyester were obtained in the same manner as in Example 1 by adding 15 parts of various types of diimide compound of the formula (II), in place of diimide compound of the formula (2). Ultraviolet transmittance measured is shown in Table 2.

TABLE 2

Light transmittance of polyesters added with various types of diimide compound of the formula (II)′

| Example | X and Z groups in formula (II)′ | | Color tone of polyester | Light transmittance | |
|---|---|---|---|---|---|
| | X | Z | | 380 nm | 400 nm |
| 12 | SO$_3$H-substituted phenyl–C=C–phenyl-SO$_3$H | phenylene | Brown | 0% | 0% |
| 13 | triphenylene-type fused ring | biphenyl | Yellow | 0% | 4.5% |
| 14 | triphenylene-type fused ring | diphenyl ketone | Orange | 0% | 12% |

TABLE 2-continued

Light transmittance of polyesters added with various types of diimide compound of the formula (II)'

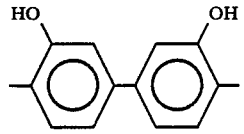

(II)'

| Example | X and Z groups in formula (II)' | | Color tone of polyester | Light transmittance | |
|---|---|---|---|---|---|
| | X | Z | | 380 nm | 400 nm |
| 15 |  HO—⟨⟩—⟨⟩—OH | (naphthalene-type bicyclic) | Light brown | 0% | 56% |

EXAMPLE 16

A transparent polyester colored in pale green and having an intrinsic viscosity of 0.60 was obtained by following the same procedure as Example 8 except that 0.005 part of copper phthalocyanine was added, and this polyester was subjected to solid-phase polymerization according to Example 7.

The solid-phase polymerization product had an intrinsic viscosity of 0.74 and contained 3.3 ppm of acetaldehyde in its chipped material. A preform was molded from the polyester by using an injection molder IS.60B (Toshiba Kiki Co., Ltd.) having its cylinder and nozzle portions set at 275° C. and operated under screw speed of 100 r.p.m., injection time of 10 seconds and mold cooling water temperature of 10° C. This preform was then blow molded by a blow molder Model BMB.3 (CORPOPLAST CORP.) set at a preheating oven temperature of 90° C., blow pressure of 20 kg/cm² and molding cycle of 10 seconds to obtain a bottle having a capacity of 1 litre. Ultraviolet transmittance of this bottle at its 350 μm thick portion was 0.4%, 0% and 0% at wavelengths of 370 nm, 380 nm and 400 nm, respectively.

COMPARATIVE EXAMPLE 1

A polyester with intrinsic viscosity of 0.70 was obtained under the same operating conditions as in Example 1 except that diimide compound of the formula (1) was not used. A 350 μm thick sheet molded from this polyester in the same manner as Example 1 showed ultraviolet transmittance of 68% at 370 nm and 69% at 380 nm. A light transmittance chart of the sheet is shown in FIG. 1.

COMPARATIVE EXAMPLE 2

A 350 μm thick sheet was obtained by dry blending 5,000 parts of polyethylene terephthalate (RT.543C ®, available from NIPPON UNIPET Co., Ltd.) with intrinsic viscosity of 0.78 with 5.5 parts of Tinuvin 326 ® (2(2,2'-hydroxy.3'-t-butyl-5'-methylphenyl)benzotriazole), a typical commercially available UV absorber, and by molding this blend into a sheet according to the method of Example 1. A light transmittance chart of this sheet is shown in FIG. 1.

Light transmittance of this sheet was 2.8% at 370 nm and 8.0% at 380 nm.

When the blend was continuously injection molded into 2 mm thick boards according to the process of Example 1, a yellow powdery substance deposited at the nozzle end of the molder, and a yellow contaminant has begun to be clearly noticed on the surfaces of about the 200th and succeeding boards.

EXAMPLE 17

A 350 μm thick transparent sheet was obtained by adding 0.4 part of diimide compound of the formula (1) to 100 parts of the same polyethylene terephthalate resin as used in Comparative Example 2 (RT-543 C ®, available from NIPPON UNIPET Co., Ltd.), and by mixing well by a V type blender and drying in vacuo, then, treating similarly to Example 1. This sheet showed light transmittance of 0.3%, 0% and 0% at wavelengths of 370 nm, 380 nm and 400 nm, respectively.

EXAMPLE 18

A blend of 0.2 part of diimide compound of the formula (2) and 100 parts of the same polyethylene terephthalate as used in Comparative Example 2 (RT.543C ®, NIPPON UNIPET Co., Ltd.) was mixed well by a V type blender, dried in vacuo and subjected to the similar treatments to Example 1 to obtain a 350 μm thick transparent sheet. This sheet showed light transmittance of 12.6%, 2.7%, 0.6% and 0.2% at wavelengths of 330 nm, 370 nm, 380 nm and 400 nm, respectively.

What is claimed is:

1. A thermoplastic polyester molded article comprising a thermoplastic polyester and an effective amount for ultraviolet screening of at least one diimide compound selected from the group consisting of compounds represented by the following formulae (I) and (II):

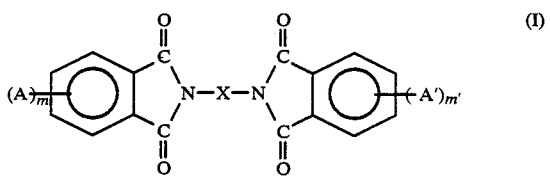

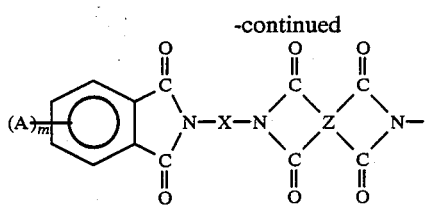
(II)

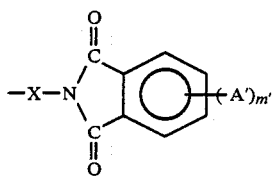

wherein m and m' represent independently an integer from 0 to 4; A and A' represent independently a member selected from the group consisting of halogen, —COOH and esters thereof, —OH, —O—C(=O)CH₃, —NH₂, —CN, —NO₂, —SO₃H and metal salts thereof, alkoxyl group, aliphatic group, and aromatic group, and when m and/or m' is 2 to 4, A and A' may be the same or different from each other; X represents

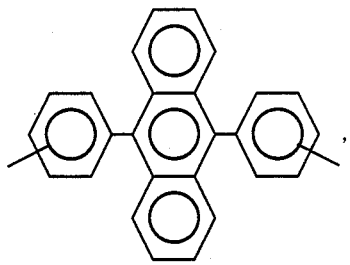

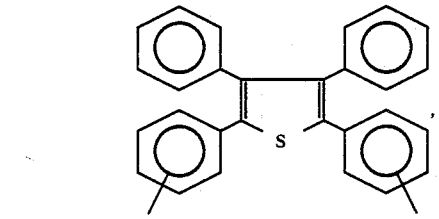

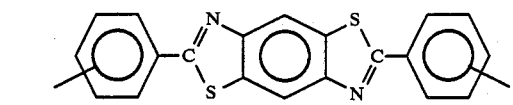

wherein Y represents SO₂, C=O, —CH=CH—, 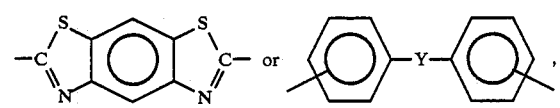

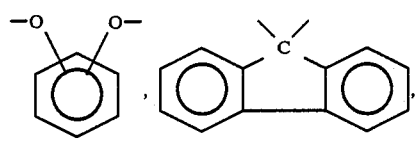

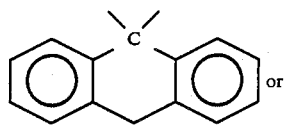

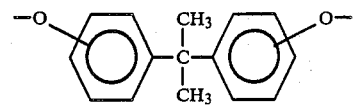

and the aromatic group contained in X may be substituted with a substituent represented by A or A'; and Z represents

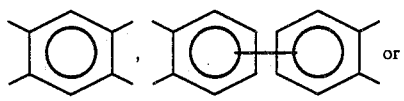

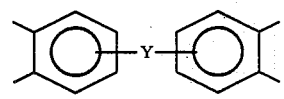

wherein Y is the same as defined above, and the aromatic group contained in Z may be substituted with a substituent represented by A or A'.

2. The thermoplastic polyester molded article according to claim 1, wherein said molded article contains further at least one of naphthalene dicarboxylic acid compounds represented by the following formula (III):

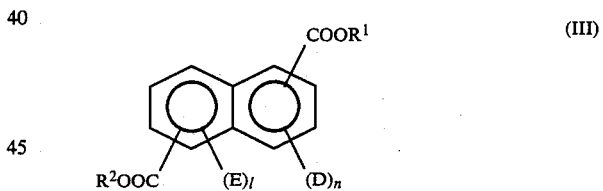

wherein $R^1$ and $R^2$ represent independently a hydrogen atom, alkyl group, or aryl group; D and E represent independently a halogen, —COOH or esters thereof, —OH, —O—C(=O)CH₃, —NH₂, —CN, —NO₂, —SO₃H or metal salts thereof, alkoxyl group, aliphatic group or aromatic group; and l and n represent respectively an integer from 0 to 3, or the following formula (IV):

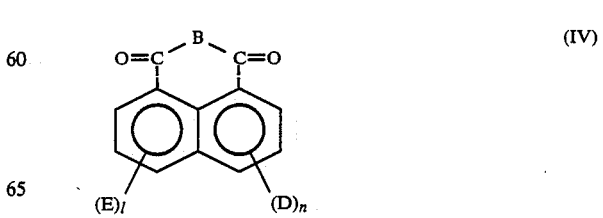

wherein E, D, l and n are the same as defined above; and B' represents —O— or

wherein R³ represents a hydrogen atom, aliphatic carbon group or aromatic carbon group, and the acid anhydride group or imide group represented by —C(=O)—B—C(=O) is bonded to the 1 and 2 positions, 1 and 8 positions or 2 and 3 positions of the naphthalene ring.

3. The thermoplastic polyester molded article according to claim 1, wherein the diimide compound represented by the formula (I) is the compound of the following formula (1):

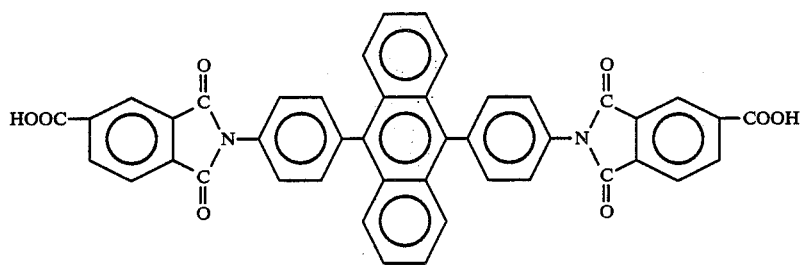

4. The thermoplastic polyester molded article according to claim 1, wherein the diimide compound represented by the formula (II) is the compound of the following formula (2):

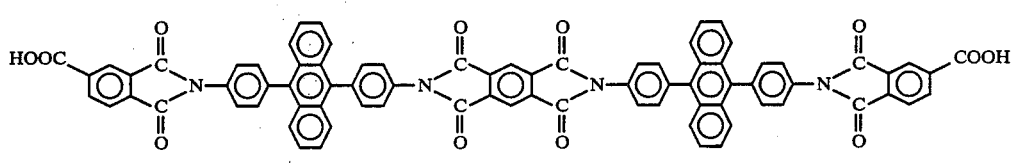

5. The thermoplastic polyester molded article according to claim 1, wherein the amount added of the diimide compound represented by the formula (I) or (II) is 0.001 parts by weight or more to 100 parts by weight of the thermoplastic polyester resin.

6. The thermoplastic polyester molded article according to claim 1, wherein the amount added of the diimide compound represented by the formula (I) or (II) is 0.001 to 10 parts by weight to 100 parts by weight of the thermoplastic polyester resin.

7. A thermoplastic polyester resin composition comprising a thermoplastic polyester and an effective amount for ultraviolet screening of at least one diimide compound selected from the group consisting of compounds represented by the following formulae (I) and (II):

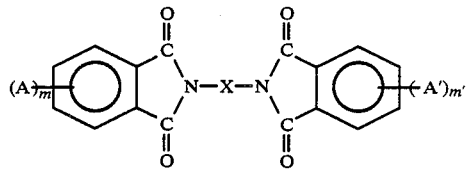

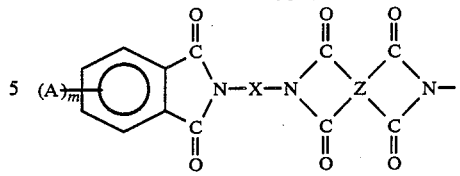

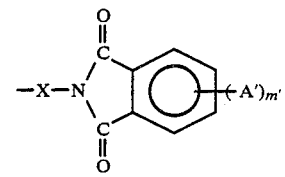

wherein m and m' represent independently an integer from 0 to 4; A and A' represent independently a member selected from the group consisting of halogen, —COOH and esters thereof, —OH, —O—C(=O)CH₃, —NH₂, —CN, —NO₂, —SO₃H and metal salts thereof, alkoxyl group, aliphatic group, and aromatic group, and when m and/or m' is 2 to 4, A and A' may be the same or different from each other; X represents

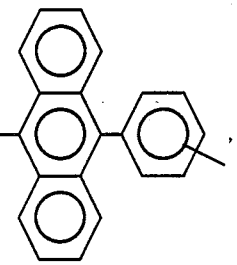

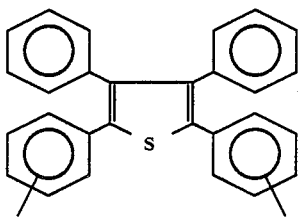

-continued

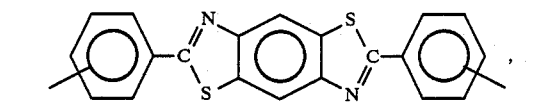

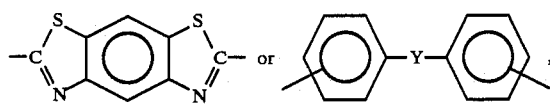

wherein Y represents SO$_2$, C=O, —CH=CH—, 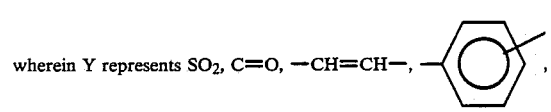

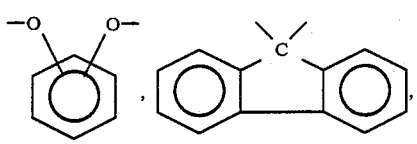

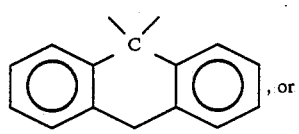

and the aromatic group contained in X may be substituted with a substituent represented by A or A'; and Z represents

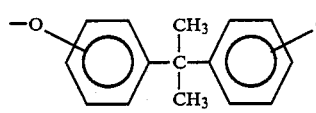

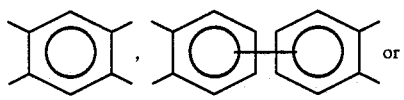

wherein Y is the same as defined above, and the aromatic group contained in Z may be substituted with a substituent represented by A or A'.

8. The thermoplastic polyester resin composition according to claim 7, wherein said composition further contains at least one of naphthalenedicarboxylic acid compounds represented by the following formula (III):

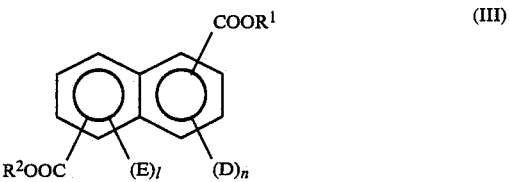

wherein R$^1$ and R$^2$ represent independently a hydrogen atom, alkyl group, or aryl group; D and E represent independently a halogen, —COOH or esters thereof, —OH, —O—C(=O)CH$_3$, NH$_2$, —CN, —NO$_2$, —SO$_3$H or metal salts thereof, alkoxyl group, aliphatic group or aromatic group; and l and n represents respectively an integer from 0 to 3, or the following formula (IV):

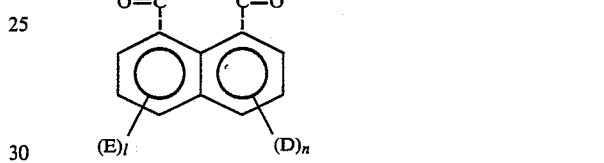

wherein E, D, l and n are the same as defined above; B' represents —O—or

wherein R$^3$ represents a hydrogen atom, aliphatic carbon group or aromatic carbon group, and the acid anhydride group or imide group represented by —C(=O)—B—C(=O)—is bonded to the 1 and 2 positions, 1 and 8 positions or 2 and 3 positions of the naphthalene ring.

9. The thermoplastic polyester resin composition according to claim 7, wherein the diimide compound represented by the formula (I) is the compound of the following formula (1):

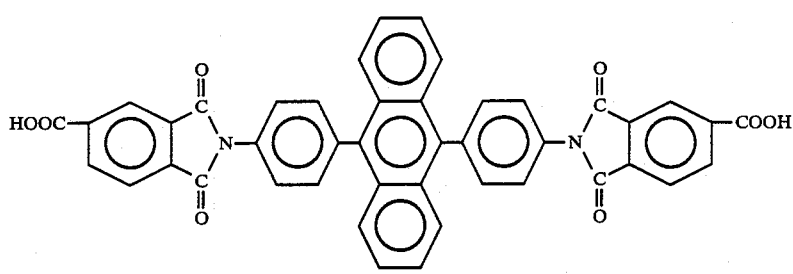

10. The thermoplastic polyester resin composition according to claim 7, wherein the diimide compound represented by the formula (II) is the compound of the following formula (2):

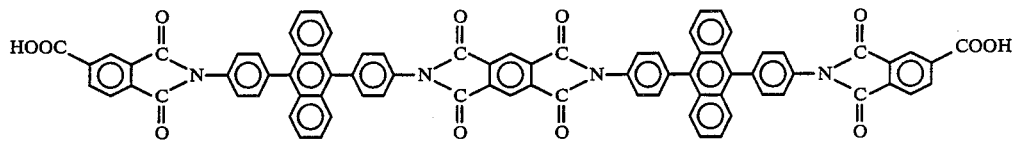 (2)

11. The thermoplastic polyester resin composition according to claim 7, wherein the amount added of the diimide compound represented by the formula (I) or (II) is 0.001 parts by weight or more to 100 parts by weight of the thermoplastic polyester resin.

12. The thermoplastic polyester resin composition according to claim 7, wherein the amount added of the diimide compound represented by the formula (I) or (II) is 0.001 to 10 parts by weight to 100 parts by weight of the thermoplastic polyester resin.

13. A process for producing a thermoplastic polyester resin composition which comprises dry blending a thermoplastic polyester and an effective amount for ultraviolet screening of at least one diimide compound selected from the group consisting of compounds represented by the following formulae (I) and (II):

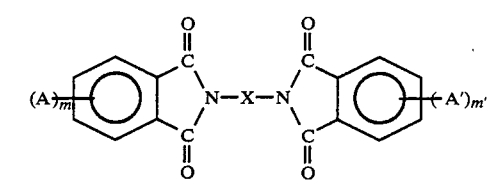 (I)

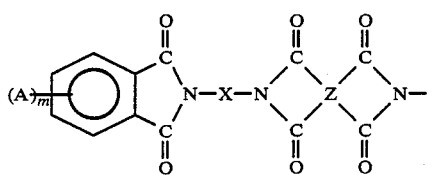 (II)

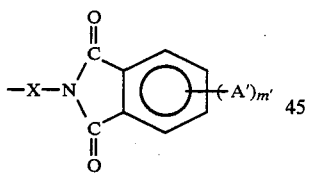

wherein m and m' represent independently an integer from 0 to 4; A and A' represent independently a member selected from the group consisting of halogen, —COOH and esters thereof, —OH, —O—C(=O)CH₃, —NH₂, —CN, —NO₂, —SO₃H and metal salts thereof, alkoxyl group, aliphatic group, and aromatic group, and when m and/or m' is 2 to 4, A and A' may be the same or different from each other; X represents

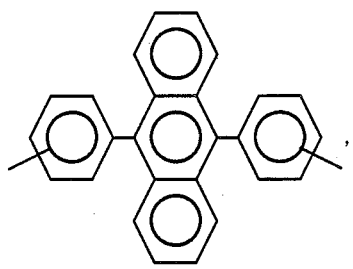

-continued

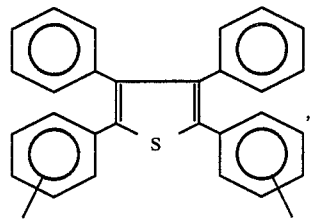

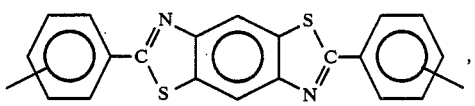

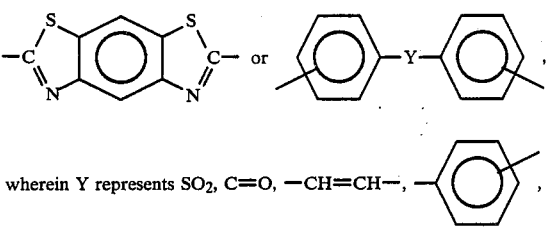

wherein Y represents SO₂, C=O, —CH=CH—,

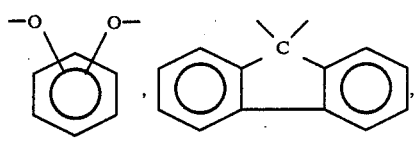

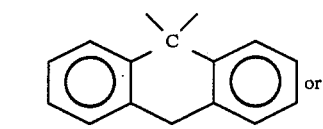 or

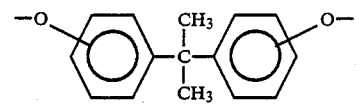

and the aromatic group contained in X may be substituted with a substituent represented by A or A'; and Z represents

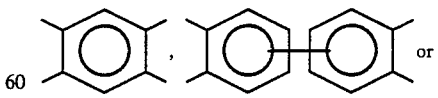

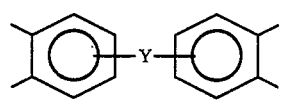

wherein Y is the same as defined above, and the aromatic group contained in Z may be substituted with a substituent represented by A or A' or comprises adding at least one diimide compound selected from the group consisting of the compounds represented by said formulae (I) and (II) in an amount effective for ultraviolet screening either before the start or in the course of polycondensation reaction for preparing said thermoplastic resin and carrying out said polycondensation reaction.

14. The process according to claim 13, wherein at least one of naphthalenedicarboxylic acid compounds represented by the following formula (III):

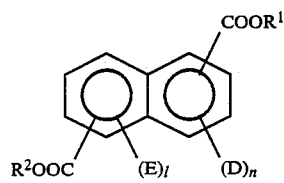
(III)

wherein $R^1$ and $R^2$ wherein independently a hydrogen atom, alkyl group, or aryl group; D and E represent independently a halogen, —COOH or esters thereof, —OH, —O—C(=O)CH$_3$, —NH$_2$, —CN, —NO$_2$, —SO$_3$H or metal salts thereof, alkoxyl group, aliphatic group or aromatic group; and l and n represents respectively an integer from 0 to 3, or the following formula (IV):

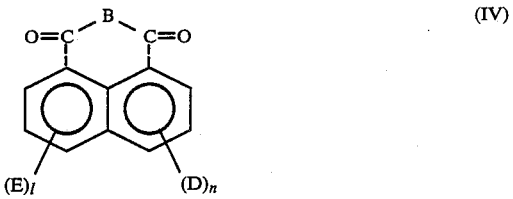
(IV)

wherein E, D, l and n are the same as defined above; and B' represents —O— or

wherein $R^3$ represents a hydrogen atom, aliphatic carbon group or aromatic carbon group, and the acid anhydride group or imide group represented by —C(=O)—B—C(=O)— is bonded to the 1 and 2 positions, 1 and 8 positions or 2 and 3 positions of the naphthalene ring is further added during the dry blending or, either before the start or in the course of the polycondensation reaction.

* * * * *

UNITED STATES PATENT AND TRADEMARK OFFICE
CERTIFICATE OF CORRECTION

PATENT NO. : 4,965,302

DATED : October 23, 1990

INVENTOR(S) : Takuji Hirahara et al

It is certified that error appears in the above-identified patent and that said Letters Patent is hereby corrected as shown below:

At column 13, line 14:

"-C(=O)-B-C($\alpha$O)-" should read: -- -C(=O)-B-C(=O)- --.

At column 26, line 68; column 30, line 31; and column 34, line 14:

"B'" should read: --B--.

Signed and Sealed this

Twenty-eighth Day of July, 1992

*Attest:*

DOUGLAS B. COMER

*Attesting Officer*     *Acting Commissioner of Patents and Trademarks*

UNITED STATES PATENT AND TRADEMARK OFFICE
CERTIFICATE OF CORRECTION

PATENT NO. : 4,965,302                              Page 1 of 2
DATED     : October 23, 1990
INVENTOR(S) : Takuji HIRAHARA ET AL It is certified that error appears in the above-identified patent and that said Letters Patent is hereby corrected as shown below:

At column 3, line 45 and at column 5, line 65, change

At column 10, line 58, last formula, change

UNITED STATES PATENT AND TRADEMARK OFFICE
CERTIFICATE OF CORRECTION

PATENT NO. : 4,965,302

DATED : October 23, 1990

INVENTOR(S) : Takuji HIRAHARA ET AL

It is certified that error appears in the above-identified patent and that said Letters Patent is hereby corrected as shown below:

At column 25, line 55, in Claim 1, at column 29, line 10, in Claim 7, at column 32, between lines 25 & 30, in Claim 13, change "  "  to  -- 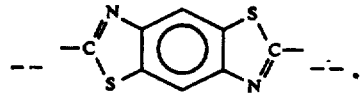 --.

Signed and Sealed this

Sixth Day of October, 1992

Attest:

DOUGLAS B. COMER

Attesting Officer

Acting Commissioner of Patents and Trademarks